United States Patent
Murase (10) Patent No.: US 10,128,718 B2
(45) Date of Patent: Nov. 13, 2018

(54) STATOR, BRUSHLESS MOTOR, AND STATOR MANUFACTURING METHOD

(71) Applicant: ASMO CO., LTD., Kosai, Shizuoka-pref. (JP)

(72) Inventor: Akio Murase, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 197 days.

(21) Appl. No.: 15/247,930

(22) Filed: Aug. 26, 2016

(65) Prior Publication Data
US 2017/0070115 A1    Mar. 9, 2017

(30) Foreign Application Priority Data

Sep. 8, 2015  (JP) .................................. 2015-176792

(51) Int. Cl.
*H02K 3/28*    (2006.01)
*H02K 3/52*    (2006.01)
*H02K 3/18*    (2006.01)

(52) U.S. Cl.
CPC ............... *H02K 3/522* (2013.01); *H02K 3/18* (2013.01)

(58) Field of Classification Search
CPC ............ H02K 3/28; H02K 3/18; H02K 3/522; H02K 1/146
See application file for complete search history.

(56) References Cited

U.S. PATENT DOCUMENTS

2004/0251752 A1* 12/2004  Shinzaki ................ H02K 3/522
                                                          310/71

FOREIGN PATENT DOCUMENTS

JP           2014-36525 A      2/2014

* cited by examiner

*Primary Examiner* — Dang Le
(74) *Attorney, Agent, or Firm* — Solaris Intellectual Property Group, PLLC (57) ABSTRACT

In a stator, winding coil sections are formed at respective teeth, and pairs of winding terminal portions that are continuous to the respective winding coil sections are guided out from between base end portions of respective adjacent teeth toward one axial direction side of the stator core. A first retaining portion that retains a base end portion of one winding terminal portion of each pair of winding terminal portions, and a second retaining portion that retains another winding terminal portion of each pair of winding terminal portions, are provided between the base end portions of the respective adjacent teeth. The first retaining portions and the second retaining portions are disposed between the base end portions of the respective adjacent teeth so as to be offset from each other in a circumferential direction and a radial direction of the stator core.

6 Claims, 6 Drawing Sheets

STATOR, BRUSHLESS MOTOR, AND STATOR MANUFACTURING METHOD

CROSS-REFERENCE TO RELATED APPLICATION

This application claims priority under 35 USC 119 from Japanese Patent application No. 2015-176792 filed on Sep. 8, 2015, the disclosure of which is incorporated by reference herein.

BACKGROUND

Technical Field

The present disclosure relates to a stator, a brushless motor, and a stator manufacturing method.

Related Art

There are conventional brushless motors including a stator, and a rotor that is rotated by a rotating magnetic field generated by the stator (see, for example, Japanese Patent Application Laid-Open (JP-A) No. 2014-36525). Generally in this type of brushless motor, the stator includes a stator core with plural teeth extending in a radiating shape, and plural windings that are wound about the stator core. Each winding includes a winding coil section that is wound onto the respective tooth and a winding terminal portion that is continuous to the winding coil section. A pair of the winding terminal portions is guided out, from between base end portions of respective adjacent teeth, toward one axial direction side of the stator core.

In the above-described stator, the respective pairs of winding terminal portions sometimes extend in a direction intersecting a radial direction of the stator core as viewed along an axial direction of the stator core, in order to connect the respective pairs of winding terminal portions to a board disposed at a back face side of the brushless motor. In such cases, an axial length of the stator, and therefore an axial length of the brushless motor, increases when one and the other of each pair of winding terminal portions are overlapped onto each other in the axial direction of the stator core.

SUMMARY

The present disclosure provides a stator, a brushless motor, and a stator manufacturing method capable of shortening an axial length of the stator, and therefore and axial length of the brushless motor.

A first aspect of the present disclosure is a stator including a stator core that includes plural teeth extending in a radiating shape, plural winding coil sections that are respectively wound onto the plural teeth, plural pairs of winding terminal portions that are respectively continuous to the plural winding coil sections, that are guided out from between base end portions of adjacent teeth of the plural teeth toward one axial direction side of the stator core, and that extend in directions intersecting a stator core radial direction as viewed along an axial direction of the stator core, plural first retaining portions that are each provided between the base end portions of the respective adjacent teeth, and that each retain a base end portion of one winding terminal portion of the respective pair of winding terminal portions, and plural second retaining portions that are each provided between the base end portions of the respective adjacent teeth, that each retain a base end portion of an other winding terminal portion of the respective pair of winding terminal portions, and that are each disposed between the base end portions of the respective adjacent teeth so as to be offset in a circumferential direction and a radial direction of the stator core with respect to the respective first retaining portion.

In the first aspect, the first retaining portions that each retain the base end portion of the one of the respective pair of winding terminal portions, and the second retaining portions that each retain the base end portion of the other winding terminal portion of the respective pair of winding terminal portions, are provided between the base end portions of the respective adjacent teeth. The first retaining portions and the second retaining portions are disposed between the base end portions of the respective adjacent teeth so as to be offset from each other in a circumferential direction and a radial direction of the stator core.

Thus, even in cases in which each pair of winding terminal portions, which have been guided out from between the base end portions of the respective adjacent teeth toward one axial direction side of the stator core, extend in directions intersecting a radial direction of the stator core as viewed along the axial direction of the stator core, the pair of winding terminal portions can be suppressed from being overlapped onto each other in the axial direction of the stator core. Thus, the pair of winding terminal portions can be disposed alongside each other in a direction intersecting the axial direction of the stator core.

This enables the bulkiness of the pairs of winding terminal portions at the one axial direction side of the stator core to be suppressed, thereby enabling an axial length of the stator, and therefore an axial length of a brushless motor, to be made shorter than, for example, cases in which a pair of winding terminal portions are overlapped onto each other in the axial direction of the stator core.

A second aspect of the present disclosure is the stator of the first aspect, wherein, in a case in which the plural teeth are twelve in number, the plural winding coil sections are classified into winding start winding coil sections and winding finish winding coil sections that are each continuous to the respective winding start winding coil section, and the plural teeth configure a first to a twelfth tooth in sequence around a circumferential direction of the stator core, a first of the winding coil sections wound onto the first tooth is a winding start winding coil section, a second of the winding coil sections wound onto the second tooth is a winding finish winding coil section, a third of the winding coil sections wound onto the third tooth is a winding start winding coil section, a fourth of the winding coil sections wound onto the fourth tooth is a winding finish winding coil section, a fifth of the winding coil sections wound onto the fifth tooth is a winding finish winding coil section, a sixth of the winding coil sections wound onto the sixth tooth is a winding start winding coil section, a seventh of the winding coil sections wound onto the seventh tooth is a winding start winding coil section, an eighth of the winding coil sections wound onto the eighth tooth is a winding finish winding coil section, a ninth of the winding coil sections wound onto the ninth tooth is a winding start winding coil section, a tenth of the winding coil sections wound onto the tenth tooth is a winding finish winding coil section, an eleventh of the winding coil sections wound onto the eleventh tooth is a winding finish winding coil section, and a twelfth of the winding coil sections wound onto the twelfth tooth is a winding start winding coil section.

A third aspect of the present disclosure is the stator of the second aspect, wherein a first of the winding terminal portions that is a winding start winding terminal portion continuous to the first winding coil section, and a second of the winding terminal portions that is a winding finish winding terminal portion continuous to the second winding coil section, are guided out from between the base end portion of the first tooth and the base end portion of the second tooth, a third of the winding terminal portions that is a winding start winding terminal portion continuous to the third winding coil section, and a fourth of the winding terminal portions that is a winding finish winding terminal portion continuous to the fourth winding coil section, are guided out from between the base end portion of the third tooth and the base end portion of the fourth tooth, a fifth of the winding terminal portions that is a winding finish winding terminal portion continuous to the fifth winding coil section, and a sixth of the winding terminal portions that is a winding start winding terminal portion continuous to the sixth winding coil section, are guided out from between the base end portion of the fifth tooth and the base end portion of the sixth tooth, a seventh of the winding terminal portions that is a winding start winding terminal portion continuous to the seventh winding coil section, and an eighth of the winding terminal portions that is a winding finish winding terminal portion continuous to the eighth winding coil section, are guided out from between the base end portion of the seventh tooth and the base end portion of the eighth tooth, a ninth of the winding terminal portions that is a winding start winding terminal portion continuous to the ninth winding coil section, and a tenth of the winding terminal portions that is a winding finish winding terminal portion continuous to the tenth winding coil section, are guided out from between the base end portion of the ninth tooth and the base end portion of the tenth tooth, and an eleventh of the winding terminal portions that is a winding finish winding terminal portion continuous to the eleventh winding coil section, and a twelfth of the winding terminal portions that is a winding start winding terminal portion continuous to the twelfth winding coil section, are guided out from between the base end portion of the eleventh tooth and the base end portion of the twelfth tooth.

A fourth aspect of the present disclosure is the stator of the third aspect, wherein the first retaining portion retaining the base end portion of the first winding terminal portion as the one winding terminal portion, is disposed further, than the second retaining portion retaining the base end portion of the second winding terminal portion as the other winding terminal portion, to the first tooth side and to the stator core radial direction outside, the first winding terminal portion and the second winding terminal portion extend from between the base end portion of the first tooth and the base end portion of the second tooth toward a leading end portion of the third tooth, the first retaining portion retaining the base end portion of the third winding terminal portion as the one winding terminal portion, is disposed further, than the second retaining portion retaining the base end portion of the fourth winding terminal portion as the other winding terminal portion, to the third tooth side and to the stator core radial direction outside, the third winding terminal portion and the fourth winding terminal portion extend from between the base end portion of the third tooth and the base end portion of the fourth tooth toward a leading end portion of the fourth tooth, the first retaining portion retaining the base end portion of the fifth winding terminal portion as the one winding terminal portion, is disposed further, than the second retaining portion retaining the base end portion of the sixth winding terminal portion as the other winding terminal portion, to the fifth tooth side and to the stator core radial direction inside, the fifth winding terminal portion and the sixth winding terminal portion extend from between the base end portion of the fifth tooth and the base end portion of the sixth tooth toward a leading end portion of the sixth tooth, the first retaining portion retaining the base end portion of the eighth winding terminal portion as the one winding terminal portion, is disposed further, than the second retaining portion retaining the base end portion of the seventh winding terminal portion as the other winding terminal portion, to the eighth tooth side and to the stator core radial direction inside, the seventh winding terminal portion and the eighth winding terminal portion extend from between the base end portion of the seventh tooth and the base end portion of the eighth tooth toward a leading end portion of the seventh tooth, the first retaining portion retaining the base end portion of the tenth winding terminal portion as the one winding terminal portion, is disposed further, than the second retaining portion retaining the base end portion of the ninth winding terminal portion as the other winding terminal portion, to the tenth tooth side and to the stator core radial direction inside, the ninth winding terminal portion and the tenth winding terminal portion extend from between the base end portion of the ninth tooth and the base end portion of the tenth tooth toward a leading end portion of the ninth tooth, the first retaining portion retaining the base end portion of the twelfth winding terminal portion as the one winding terminal portion, is disposed further, than the second retaining portion retaining the base end portion of the eleventh winding terminal portion as the other winding terminal portion, to the twelfth tooth side and to the stator core radial direction outside, and the eleventh winding terminal portion and the twelfth winding terminal portion extend from between the base end portion of the eleventh tooth and the base end portion of the twelfth tooth toward a leading end portion of the tenth tooth.

A fifth aspect of the present disclosure is a brushless motor including the stator of any one of the first aspect to the fourth aspect and a rotor that is rotated by a rotating magnetic field generated by the stator.

A sixth aspect of the present disclosure is a stator manufacturing method for manufacturing the stator of any one of the first aspect to the fourth aspect. The stator manufacturing method includes retaining each of the pairs of winding terminal portions, which have been guided out toward the one axial direction side of the stator, between the base end portions of the respective adjacent teeth using the respective first retaining portion and the respective second retaining portion, inserting a tool between the respective adjacent teeth, bending each of the pairs of winding terminal portions using the tool, and turning each of the pairs of winding terminal portions such that the respective pair of winding terminal portions extend in directions intersecting a radial direction of the stator core as viewed along the axial direction view of the stator core.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure is explained below, based on the drawings.

Figure 1:
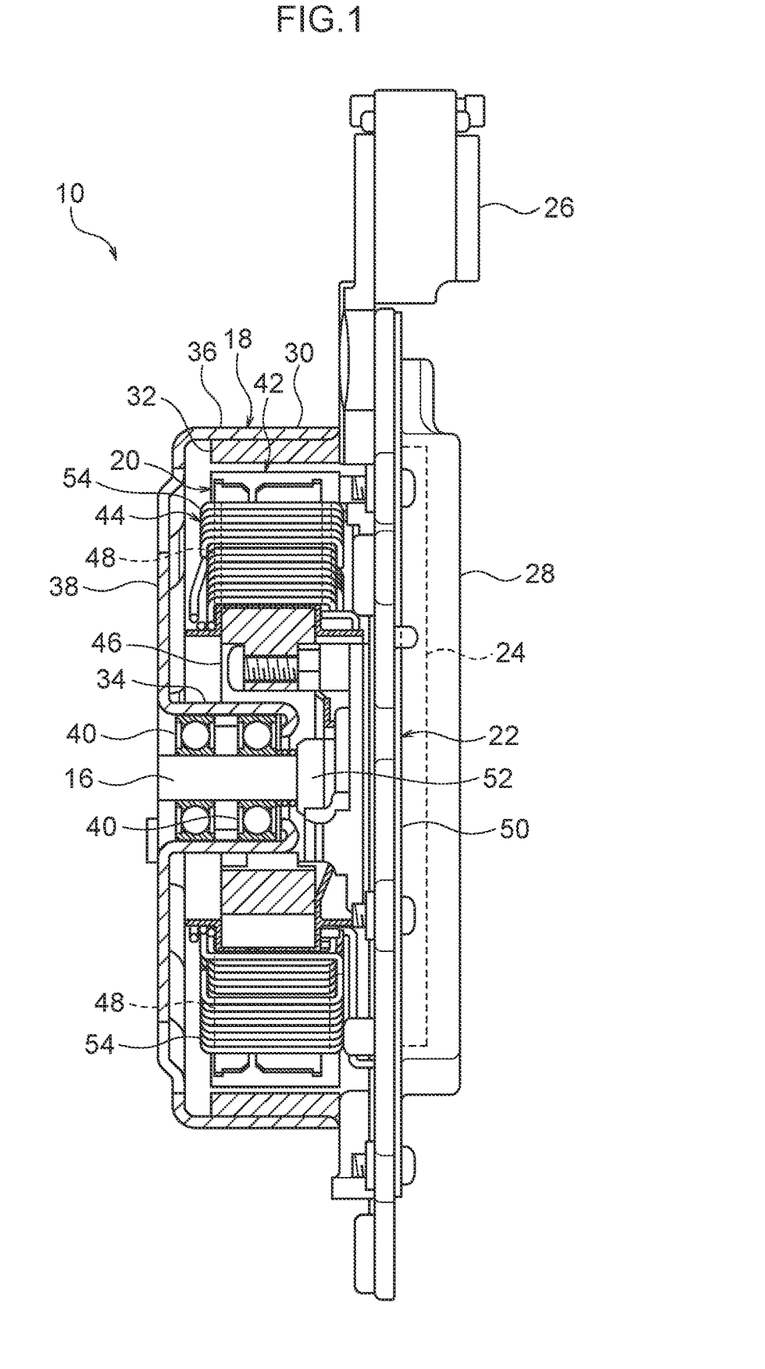
FIG. 1 is a side cross-section of a brushless motor according to an exemplary embodiment of the present disclosure.

As illustrated in FIG. 1, a brushless motor 10 according to an exemplary embodiment of the present disclosure includes a motor shaft 16, a rotor 18, a stator 20, a centerpiece 22, a circuit board 24, a connecting member 26, and a board case 28.

The rotor 18 is rotated by a rotating magnetic field generated by the stator 20, described later, and includes a rotor housing 30 and rotor magnets 32. A circular tube shaped shaft bearing housing section 34 disposed at the radial direction outside of the motor shaft 16, and an outer tube section 36 disposed at the radial direction outside of the shaft bearing housing section 34, are formed at the rotor housing 30. The rotor magnets 32 are fixed to an inner peripheral face of the outer tube section 36.

One axial direction side of the rotor housing 30 is open, and the other axial direction side of the rotor housing 30 is formed with a bottom wall section 38 that links the shaft bearing housing section 34 and the outer tube section 36 together. The above-described shaft bearing housing section 34 extends out from the bottom wall section 38 toward the open side of the rotor housing 30.

A pair of shaft bearings 40 are housed inside the shaft bearing housing section 34. The motor shaft 16 is assembled to the pair of shaft bearings 40. One end side of the motor shaft 16 projects out from the shaft bearing housing section 34 toward the centerpiece 22, described later.

The stator 20 includes a stator core 42 and plural windings 44. The stator core 42 includes a ring shaped section 46 provided at the radial direction outside of the shaft bearing housing section 34, and plural teeth 48 formed in a radiating shape around the circumference of the ring shaped section 46. The stator core 42 is configured by a core main body made of metal, and an insulator made of resin that covers the core main body. The stator core 42 is housed inside the outer tube section 36, and is disposed in the radial direction between the shaft bearing housing section 34 and the rotor magnets 32. The plural windings 44 are wound about the stator core 42.

The centerpiece 22 includes a flat disk shaped main body section 50. The main body section 50 is disposed facing the opening of the rotor housing 30. The above-described stator core 42 is fixed to the main body section 50. A recess shaped shaft support section 52 open toward the shaft bearing housing section 34 is formed at a center portion of the main body section 50. The one end of the motor shaft 16 is press-fit into and retained by the shaft support section 52.

The circuit board 24 is fixed to the main body section 50 at the opposite side to the stator core 42. An electronic circuit for switching current supplied to each winding 44 is formed at the circuit board 24. The connecting member 26 is provided on one side of the main body section 50. A connector terminal provided at the connecting member 26 is electrically connected to the electronic circuit formed at the circuit board 24.

The board case 28 is formed in a flat box shape, and is assembled to the main body section 50 from the opposite side of the main body section 50 to the stator core 42. The circuit board 24 is housed in a space formed between the board case 28 and the main body section 50.

In the above-described brushless motor 10, after current passing through the plural windings 44 is switched by the electronic circuit formed at the circuit board 24, a rotating magnetic field is generated by the stator 20, and the rotor 18 is rotated by attraction force and repulsion force operating between the rotating magnetic field and the rotor magnets 32.

Explanation follows regarding the structure of the stator 20 according to the exemplary embodiment of the present disclosure in more detail, as well as a manufacturing method of the stator 20.

As an example, the above-described brushless motor 10 according to the present exemplary embodiment of the present disclosure is a twelve-slot, ten-pole motor. Thus, as illustrated in FIG. 2, in the stator 20 according to the present exemplary embodiment of the present disclosure, the plural teeth 48 are twelve in number.

Figure 2:
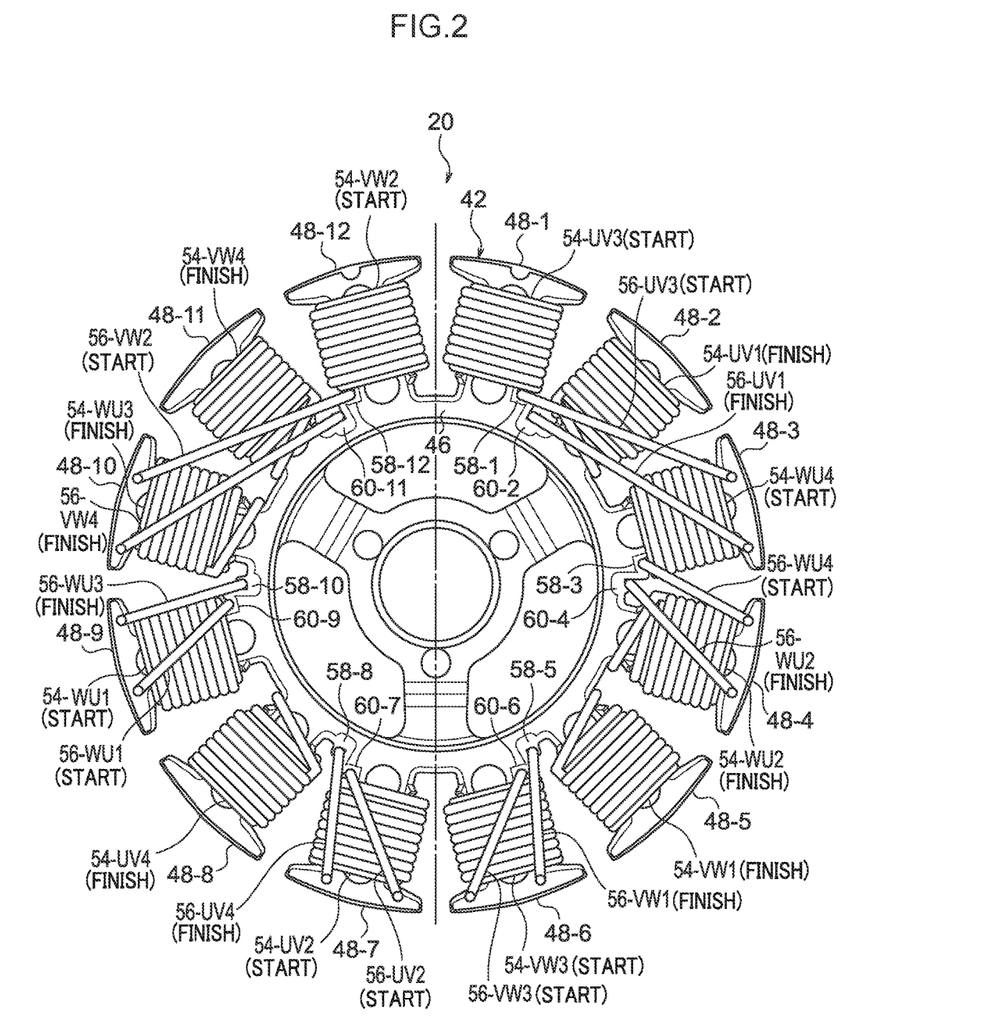
FIG. 2 is a plan view of the stator illustrated in FIG. 1.

In order to distinguish between each of the plural teeth 48 in FIG. 2, identification numbers 1 to 12 are appended in sequence around the circumferential direction of the stator core 42 to the reference numerals of the plural teeth 48. In the following explanation, the identification numbers are appended to the reference numerals of the plural teeth 48 when distinguishing between each of the plural teeth 48.

The windings are respectively wound onto the plural teeth 48 by concentrated winding to form plural winding coil sections 54. The plural winding coil sections 54 configure a UV phase, a VW phase, and a WU phase. The plural winding coil sections 54 are classified into winding start winding coil sections, and winding finish winding coil sections that are continuous to the respective winding start winding coil sections.

In order to facilitate understanding of which phase each of the plural winding coil sections 54 is, in FIG. 2, "phase type and number" are appended to the reference numerals of the plural winding coil sections 54. In the following explanation, the "phase type and number" are appended to the reference numerals of the plural winding coil sections 54 when distinguishing between each of the plural winding coil sections 54.

In order to facilitate understanding as to whether each of the plural winding coil sections 54 is a winding start winding coil section or a winding finish winding coil section, the word "start" or "finish" is appended as appropriate, in addition to the "phase type and number", to the reference numerals of the plural winding coil sections 54. Specific explanation follows regarding the plural winding coil sections 54.

(1) The first winding coil section 54-UV3 (start) that is wound onto the first tooth 48-1 is the third coil section of the UV phase, and is the winding start winding coil section thereof.

(2) The second winding coil section 54-UV1 (finish) that is wound onto the second tooth 48-2 is the first coil section of the UV phase, and is the winding finish winding coil section thereof continuous to the winding start winding coil section 54-UV2 (start) that is the second coil section of the UV phase.

(3) The third winding coil section 54-WU4 (start) that is wound onto the third tooth 48-3 is the fourth coil section of the WU phase, and is the winding start winding coil section thereof.

(4) The fourth winding coil section 54-WU2 (finish) that is wound onto the fourth tooth 48-4 is the second coil section of the WU phase, and is the winding finish winding coil section thereof continuous to the winding start winding coil section 54-WU1 (start) that is the first coil section of the WU phase.

(5) The fifth winding coil section 54-VW1 (finish) that is wound onto the fifth tooth 48-5 is the first coil section of the VW phase, and is the winding finish winding coil section thereof continuous to the winding start winding coil section 54-VW2 (start) that is the second coil section of the VW phase.

(6) The sixth winding coil section 54-VW3 (start) that is wound onto the sixth tooth 48-6 is the third coil section of the VW phase, and is the winding start winding coil section thereof.

(7) The seventh winding coil section 54-UV2 (start) that is wound onto the seventh tooth 48-7 is the second coil section of the UV phase, and is the winding start winding coil section thereof.

(8) The eighth winding coil section 54-UV4 (finish) that is wound onto the eighth tooth 48-8 is the fourth coil section of the UV phase, and is the winding finish winding coil section thereof continuous to the winding start winding coil section 54-UV3 (start) that is the third coil section of the UV phase.

(9) The ninth winding coil section 54-WU1 (start) that is wound onto the ninth tooth 48-9 is the first coil section of the WU phase, and is the winding start winding coil section thereof.

(10) The tenth winding coil section 54-WU3 (finish) that is wound onto the tenth tooth 48-10 is the third coil section of the WU phase, and is the winding finish winding coil section thereof continuous to the winding start winding coil section 54-WU4 (start) that is the fourth coil section of the WU phase.

(11) The eleventh winding coil section 54-VW4 (finish) that is wound onto the eleventh tooth 48-11 is the fourth coil section of the VW phase, and is the winding finish winding coil section thereof continuous to the winding start winding coil section 54-VW3 (start) that is the third coil section of the VW phase.

(12) The twelfth winding coil section 54-VW2 (start) that is wound onto the twelfth tooth 48-12 is the second coil section of the VW phase, and is the winding start winding coil section thereof.

After the plural winding coil sections 54 have been wound onto the respective plural teeth 48 as described above, pairs of winding terminal portions 56 that are respectively continuous to adjacent winding coil sections 54 are respectively guided out from between base end portions of adjacent teeth 48 of the plural teeth 48 toward one axial direction side of the stator core 42. The one axial direction side of the stator core 42 corresponds to the circuit board 24 side (a back face side of the brushless motor 10) illustrated in FIG. 1.

In order to facilitate understanding of which winding coil section 54 each of the plural winding terminal portions 56 is continuous to, in FIG. 2, "phase type and number", corresponding to those of the plural winding coil sections 54, are appended to the reference numerals of the plural winding terminal portions 56. In the following explanation, the "phase type and number" are appended to the reference numerals of the plural winding terminal portions 56 when distinguishing between each of the plural winding terminal portions 56.

In order to facilitate understanding as to whether each of the plural winding terminal portions 56 is a winding start winding terminal portion or a winding finish winding terminal portion, the word "start" or "finish" is appended as appropriate, in addition to the "phase type and number", to the reference numerals of the plural winding terminal portions 56. Specific explanation follows regarding the plural winding terminal portions 56.

(1) The first winding terminal portion 56-UV3 (start), this being a winding start winding terminal portion that is continuous to the first winding coil section 54-UV3 (start), and the second winding terminal portion 56-UV1 (finish), this being a winding finish winding terminal portion that is continuous to the second winding coil section 54-UV1 (finish), are guided out from between the base end portion of the first tooth 48-1 and the base end portion of the second tooth 48-2.

(2) The third winding terminal portion 56-WU4 (start), this being a winding start winding terminal portion that is continuous to the third winding coil section 54-WU4 (start), and the fourth winding terminal portion 56-WU2 (finish), this being a winding finish winding terminal portion that is continuous to the fourth winding coil section 54-WU2 (finish), are guided out from between the base end portion of the third tooth 48-3 and the base end portion of the fourth tooth 48-4.

(3) The fifth winding terminal portion 56-VW1 (finish), this being a winding finish winding terminal portion that is continuous to the fifth winding coil section 54-VW1 (finish), and the sixth winding terminal portion 56-VW3 (start), this being a winding start winding terminal portion that is continuous to the sixth winding coil section 54-VW3 (start), are guided out from between the base end portion of the fifth tooth 48-5 and the base end portion of the sixth tooth 48-6.

(4) The seventh winding terminal portion 56-UV2 (start), this being a winding start winding terminal portion that is continuous to the seventh winding coil section 54-UV2 (start), and the eighth winding terminal portion 56-UV4 (finish), this being a winding finish winding terminal portion that is continuous to the eighth winding coil section 54-UV4 (finish), are guided out from between the base end portion of the seventh tooth 48-7 and the base end portion of the eighth tooth 48-8.

(5) The ninth winding terminal portion 56-WU1 (start), this being a winding start winding terminal portion that is continuous to the ninth winding coil section 54-WU1 (start), and the tenth winding terminal portion 56-WU3 (finish), this being a winding finish winding terminal portion that is continuous to the tenth winding coil section 54-WU3 (finish), are guided out from between the base end portion of the ninth tooth 48-9 and the base end portion of the tenth tooth 48-10.

(6) The eleventh winding terminal portion 56-VW4 (finish), this being a winding finish winding terminal portion that is continuous to the eleventh winding coil section 54-VW4 (finish), and the twelfth winding terminal portion 56-VW2 (start), this being a winding start winding terminal portion that is continuous to the twelfth winding coil section 54-VW2 (start), are guided out from between the base end portion of the eleventh tooth 48-11 and the base end portion of the twelfth tooth 48-12.

As illustrated in FIG. 2, in the stator 20 according to the present exemplary embodiment, a first retaining portion 58 that retains a base end portion of one winding terminal portion 56 of each pair of winding terminal portions 56, and a second retaining portion 60 that retains a base end portion of another winding terminal portion 56 of each pair of winding terminal portions 56, are provided between the base end portions of respective adjacent teeth 48.

More specifically, of the metal core main body and the resin insulator that configure the stator core 42, the first retaining portions 58 and the second retaining portions 60 are formed at the insulator. Each first retaining portion 58 and respective second retaining portion 60 are disposed between the base end portions of respective adjacent teeth 48 so as to be offset from each other in a circumferential direction and a radial direction of the stator core 42. The first retaining portions 58 and the second retaining portions 60 are each formed in a recessed shape, and the pairs of winding terminal portions 56 are respectively clamped and retained by the first retaining portions 58 and the second retaining portions 60.

In order to distinguish between each of the plural first retaining portions 58 and the plural second retaining portions 60, in FIG. 2, identification numbers 1 to 12, corresponding to those of the respective plural teeth 48-1 to 48-12, are appended to the reference numerals of the plural first retaining portions 58 and the plural second retaining portions 60. In the following explanation, the identification numbers 1 to 12 are appended to the reference numerals of the plural first retaining portions 58 and the plural second retaining portions 60 when distinguishing between each of the plural first retaining portions 58 and the plural second retaining portions 60.

Specific explanation follows regarding the first retaining portions 58 and the second retaining portions 60 provided between the base end portions of respective adjacent teeth 48, and the pairs of winding terminal portions 56 retained by the respective first retaining portions 58 and second retaining portions 60.

Figure 3:
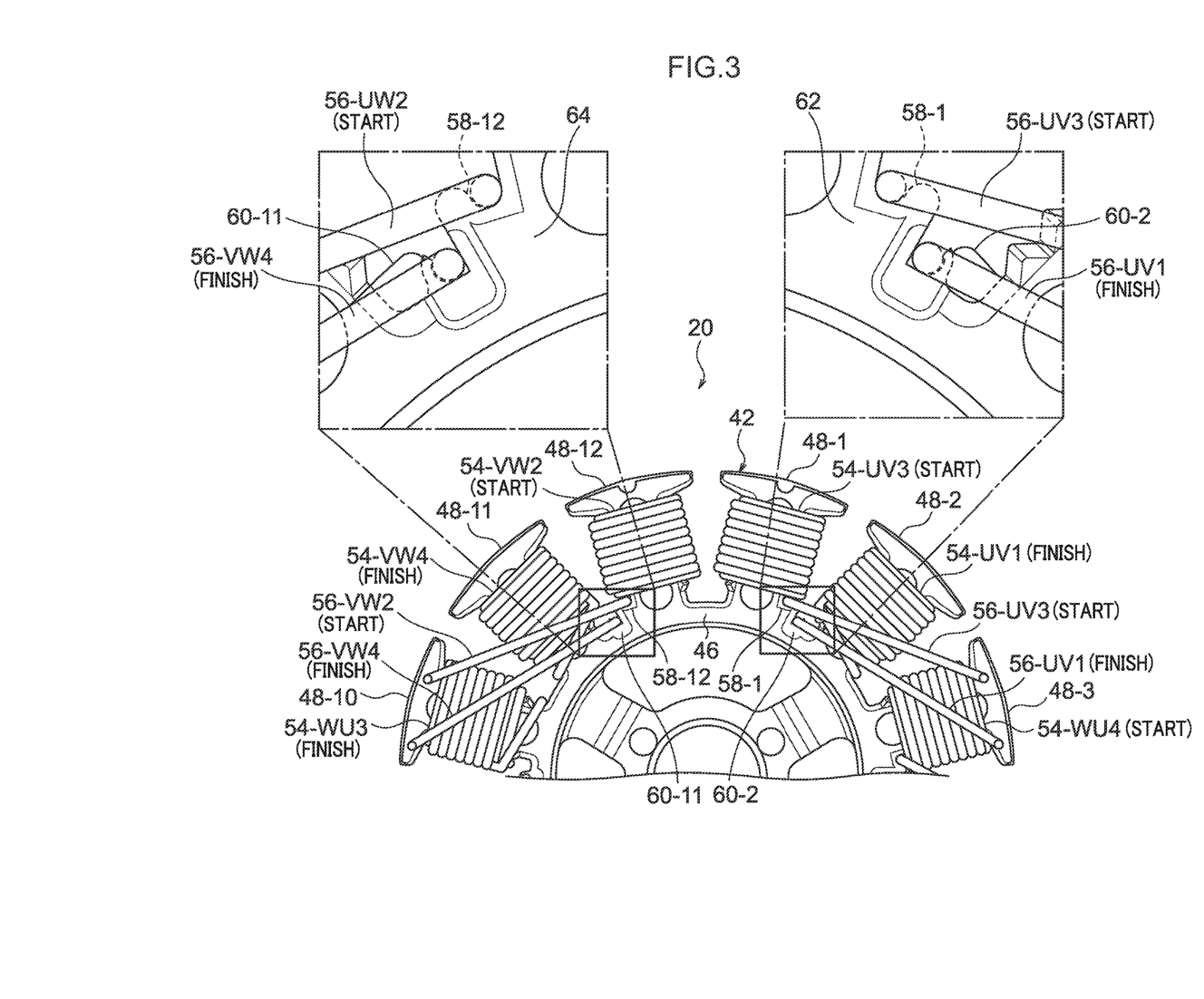
FIG. 3 is an enlarged plan view of relevant portions of the stator illustrated in FIG. 2.

(1) The first retaining portion 58-1 and the second retaining portion 60-2 are provided between the base end portions of the adjacent teeth 48-1, 48-2. The first retaining portion 58-1 is disposed close to the base end portion of the first tooth 48-1, and the second retaining portion 60-2 is disposed close to the base end portion of the second tooth 48-2. The base end portion of the first winding terminal portion 56-UV3 (start) is retained as the one winding terminal portion by the first retaining portion 58-1, and the base end portion of the second winding terminal portion 56-UV1 (finish) is retained as the other winding terminal portion by the second retaining portion 60-2. A thickened portion (such as a thickened portion 62 in FIG. 3) is formed as appropriate between the ring shaped section 46 and the first retaining portion 58-1, such that the first retaining portion 58-1 is disposed further than the second retaining portion 60-2 to the stator core 42 radial direction outside.

(2) The first retaining portion 58-3 and the second retaining portion 60-4 are provided between the base end portions of the adjacent teeth 48-3, 48-4. The first retaining portion 58-3 is disposed close to the base end portion of the third tooth 48-3, and the second retaining portion 60-4 is disposed close to the base end portion of the fourth tooth 48-4. The base end portion of the third winding terminal portion 56-WU4 (start), serving as one of the one winding terminal portions, is retained by the first retaining portion 58-3, and the base end portion of the fourth winding terminal portion 56-WU2 (finish), serving as one of the other winding terminal portions, is retained by the second retaining portion 60-4. A thickened portion is formed as appropriate between the ring shaped section 46 and the first retaining portion 58-3, such that the first retaining portion 58-3 is disposed further than the second retaining portion 60-4 to the stator core 42 radial direction outside.

(3) The first retaining portion 58-5 and the second retaining portion 60-6 are provided between the base end portions of the adjacent teeth 48-5, 48-6. The first retaining portion 58-5 is disposed close to the base end portion of the fifth tooth 48-5, and the second retaining portion 60-6 is disposed close to the base end portion of the sixth tooth 48-6. The base end portion of the fifth winding terminal portion 56-VW1 (finish), serving as one of the one winding terminal portions, is retained by the first retaining portion 58-5, and the base end portion of the sixth winding terminal portion 56-VW3 (start), serving as one of the other winding terminal portions, is retained by the second retaining portion 60-6. A thickened portion is formed as appropriate between the ring shaped section 46 and the second retaining portion 60-6, such that the second retaining portion 60-6 is disposed further than the first retaining portion 58-5 to the stator core 42 radial direction outside.

(4) The first retaining portion 58-8 and the second retaining portion 60-7 are provided between the base end portions of the adjacent teeth 48-8, 48-7. The first retaining portion 58-8 is disposed close to the base end portion of the eighth tooth 48-8, and the second retaining portion 60-7 is disposed close to the base end portion of the seventh tooth 48-7. The base end portion of the eighth winding terminal portion 56-UV4 (finish), serving as one of the one winding terminal portions, is retained by the first retaining portion 58-8, and the base end portion of the seventh winding terminal portion 56-UV2 (start), serving as one of the other winding terminal portions, is retained by the second retaining portion 60-7. A thickened portion is formed as appropriate between the ring shaped section 46 and the second retaining portion 60-7, such that the second retaining portion 60-7 is disposed further than the first retaining portion 58-8 to the stator core 42 radial direction outside.

(5) The first retaining portion 58-10 and the second retaining portion 60-9 are provided between the base end portions of the adjacent teeth 48-10, 48-9. The first retaining portion 58-10 is disposed close to the base end portion of the tenth tooth 48-10, and the second retaining portion 60-9 is disposed close to the base end portion of the ninth tooth 48-9. The base end portion of the tenth winding terminal portion 56-WU3 (finish), serving as one of the one winding terminal portions, is retained by the first retaining portion 58-10, and the base end portion of the ninth winding terminal portion 56-WU1 (start), serving as one of the other winding terminal portions, is retained by the second retaining portion 60-9. A thickened portion is formed as appropriate between the ring shaped section 46 and the second retaining portion 60-9, such that the second retaining portion 60-9 is disposed further than the first retaining portion 58-10 to the stator core 42 radial direction outside.

(6) The first retaining portion 58-12 and the second retaining portion 60-11 are provided between the base end portions of the adjacent teeth 48-12, 48-11. The first retaining portion 58-12 is disposed close to the base end portion of the twelfth tooth 48-12, and the second retaining portion 60-11 is disposed close to the base end portion of the eleventh tooth 48-11. The base end portion of the twelfth winding terminal portion 56-VW2 (start), serving as one of the one winding terminal portions, is retained by the first retaining portion 58-12, and the base end portion of the eleventh winding terminal portion 56-VW4 (finish), serving as one of the other winding terminal portions, is retained by the second retaining portion 60-11. A thickened portion (such as a thickened portion 64 in FIG. 3) is formed as appropriate between the ring shaped section 46 and the first retaining portion 58-12, such that the first retaining portion 58-12 is disposed further than the second retaining portion 60-11 to the stator core 42 radial direction outside.

Figure 4:
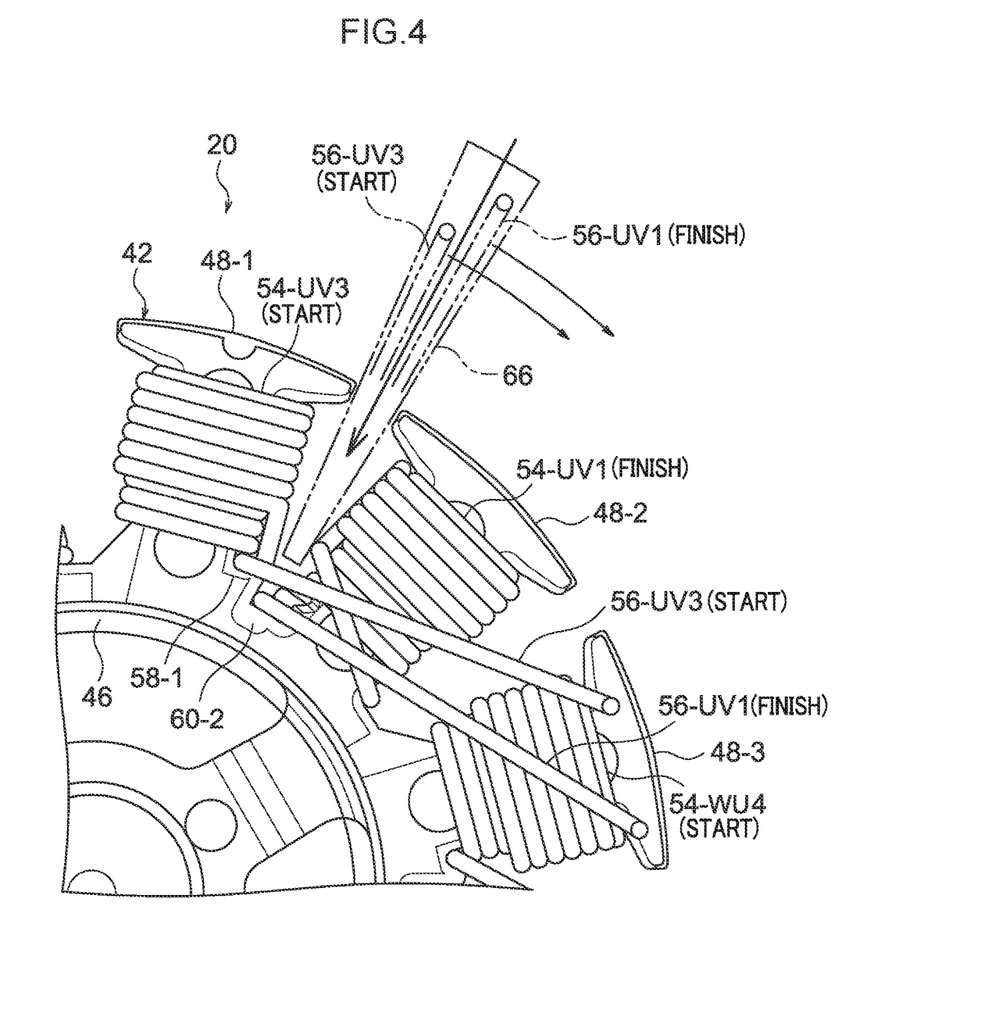
FIG. 4 is a drawing illustrating a manner of shaping a pair of winding terminal portions in the stator illustrated in FIG. 3.
Figure 5:
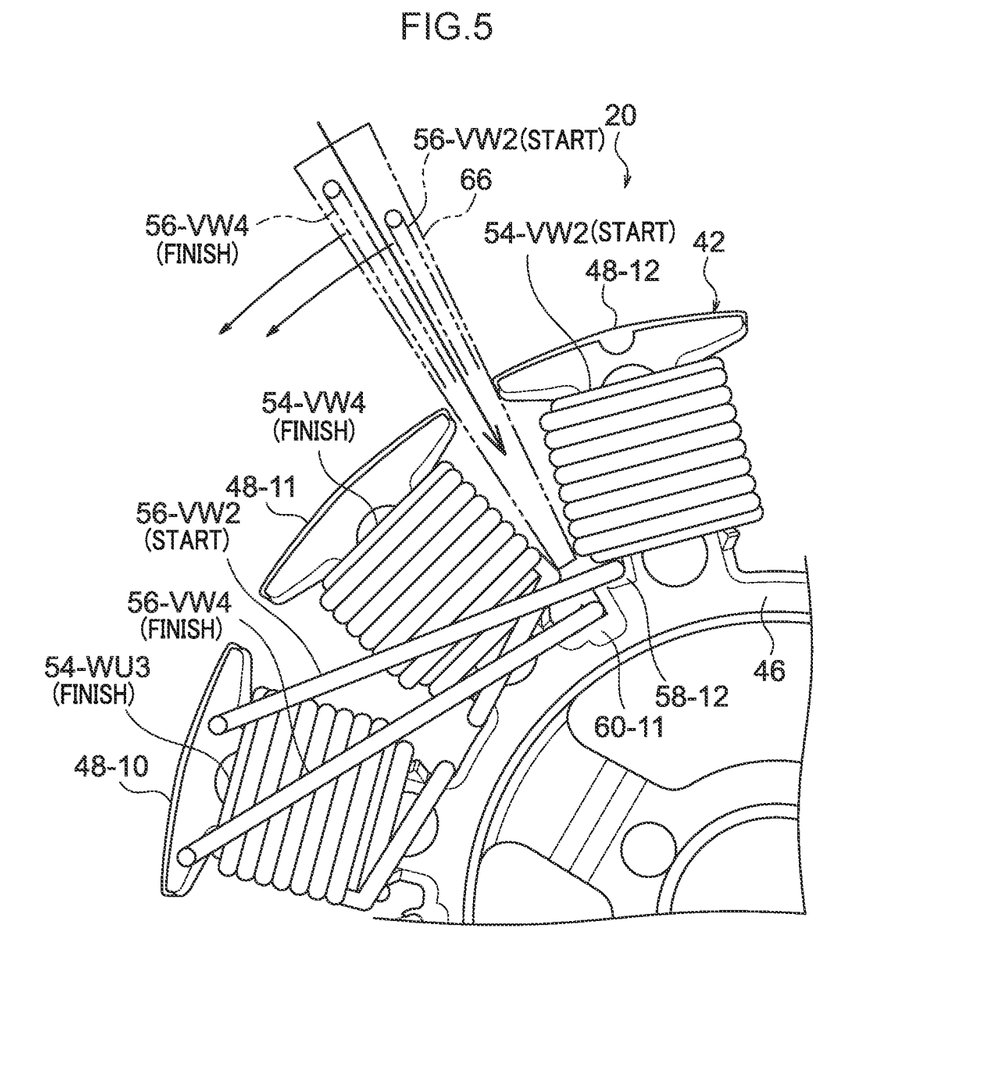
FIG. 5 is a drawing illustrating a manner of shaping a different pair of winding terminal portions to those in FIG. 4, in the stator illustrated in FIG. 3.

The plural pairs of winding terminal portions 56 described above are shaped in the following manner. As illustrated in FIGS. 4 and 5, for example, a shaping tool 66 is inserted between adjacent teeth 48. An upper face (i.e., the face on the stator core 42 one axial direction side) of the tool 66 is disposed at substantially the same height (same axial direction position) as coil ends of the winding coil sections 54.

After pairs of winding terminal portions 56 have been guided out from between the base end portions of the adjacent teeth 48 toward the one axial direction side of the stator core 42, the pairs of winding terminal portions 56 are bent over the tool 66 as illustrated by the dashed lines. Due to being bent over the tool 66, the pairs of winding terminal portions 56 are placed in a state extending along radial directions of the stator core 42.

The pairs of winding terminal portions 56, which have been bent at right angles with respect to the axial direction of the stator core 42 so as to run along radial directions of the stator core 42 in this manner, are then turned so as to extend along directions intersecting a radial direction of the stator core 42 as viewed along the axial direction of the stator core 42. Detailed explanation regarding the plural pairs of winding terminal portions 56 follows, based on FIG. 2.

(1) The first winding terminal portion 56-UV3 (start) and the second winding terminal portion 56-UV1 (finish) are bent with respect to the axial direction of the stator core 42 so as to run along radial directions of the stator core 42 from between the base end portion of the first tooth 48-1 and the base end portion of the second tooth 48-2. The first winding terminal portion 56-UV3 (start) and the second winding terminal portion 56-UV1 (finish) are then turned so as to extend from between the base end portion of the first tooth 48-1 and the base end portion of the second tooth 48-2 toward a leading end portion of the third tooth 48-3 (see also FIG. 4).

(2) The third winding terminal portion 56-WU4 (start) and the fourth winding terminal portion 56-WU2 (finish) are bent with respect to the axial direction of the stator core 42 so as to run along the radial direction of the stator core 42 from between the base end portion of the third tooth 48-3 and the base end portion of the fourth tooth 48-4. The third winding terminal portion 56-WU4 (start) and the fourth winding terminal portion 56-WU2 (finish) are then turned so as to extend from between the base end portion of the third tooth 48-3 and the base end portion of the fourth tooth 48-4 toward a leading end portion of the fourth tooth 48-4.

(3) The fifth winding terminal portion 56-VW1 (finish) and the sixth winding terminal portion 56-VW3 (start) are bent with respect to the axial direction of the stator core 42 so as to run along radial directions of the stator core 42 from between the base end portion of the fifth tooth 48-5 and the base end portion of the sixth tooth 48-6. The fifth winding terminal portion 56-VW1 (finish) and the sixth winding terminal portion 56-VW3 (start) are then turned so as to extend from between the base end portion of the fifth tooth 48-5 and the base end portion of the sixth tooth 48-6 toward a leading end portion of the sixth tooth 48-6.

(4) The seventh winding terminal portion 56-UV2 (start) and the eighth winding terminal portion 56-UV4 (finish) are bent with respect to the axial direction of the stator core 42 so as to run along the radial direction of the stator core 42 from between the base end portion of the seventh tooth 48-7 and the base end portion of the eighth tooth 48-8. The seventh winding terminal portion 56-UV2 (start) and the eighth winding terminal portion 56-UV4 (finish) are then turned so as to extend from between the base end portion of the seventh tooth 48-7 and the base end portion of the eighth tooth 48-8 toward a leading end portion of the seventh tooth 48-7.

(5) The ninth winding terminal portion 56-WU1 (start) and the tenth winding terminal portion 56-WU3 (finish) are bent with respect to the axial direction of the stator core 42 so as to run along radial directions of the stator core 42 from between the base end portion of the ninth tooth 48-9 and the base end portion of the tenth tooth 48-10. The ninth winding terminal portion 56-WU1 (start) and the tenth winding terminal portion 56-WU3 (finish) are then turned so as to extend from between the base end portion of the ninth tooth 48-9 and the base end portion of the tenth tooth 48-10 toward a leading end portion of the ninth tooth 48-9.

(6) The eleventh winding terminal portion 56-VW4 (finish) and the twelfth winding terminal portion 56-VW2 (start) are bent with respect to the axial direction of the stator core 42 so as to run from between the base end portion of the eleventh tooth 48-11 and the base end portion of the twelfth tooth 48-12 along radial directions of the stator core 42. The eleventh winding terminal portion 56-VW4 (finish) and the twelfth winding terminal portion 56-VW2 (start) are then turned so as to extend from between the base end portion of the eleventh tooth 48-11 and the base end portion of the twelfth tooth 48-12 toward a leading end portion of the tenth tooth 48-10 (see also FIG. 5).

Note that a leading end portion of each winding terminal portion 56 described above is bent toward the one axial direction side of the stator core 42. The leading end portion of each winding terminal portion 56 may be bent prior to bending the winding terminal portion 56 at right angles with respect to the axial direction of the stator core 42, or may be bent after bending the winding terminal portion 56 at right angles with respect to the axial direction of the stator core 42. The leading end portion of each winding terminal portion 56 may also be bent after turning the winding terminal portion 56 so as to extend in directions intersecting a radial direction of the stator core 42.

The stator 20 is manufactured in the above manner. The leading end portion of each winding terminal portion 56 is then pierced through the main body section 50 of the centerpiece 22 illustrated in FIG. 1, and directly connected to the circuit board 24.

Explanation follows regarding operation of the present exemplary embodiment of the present disclosure.

Explanation first follows regarding a comparative example, in order to clarify operation of the present exemplary embodiment of the present disclosure. In order to facilitate comparison with the present exemplary embodiment of the present disclosure, the following comparative example employs the same reference numerals as those in the present exemplary embodiment of the present disclosure.

Figure 6:
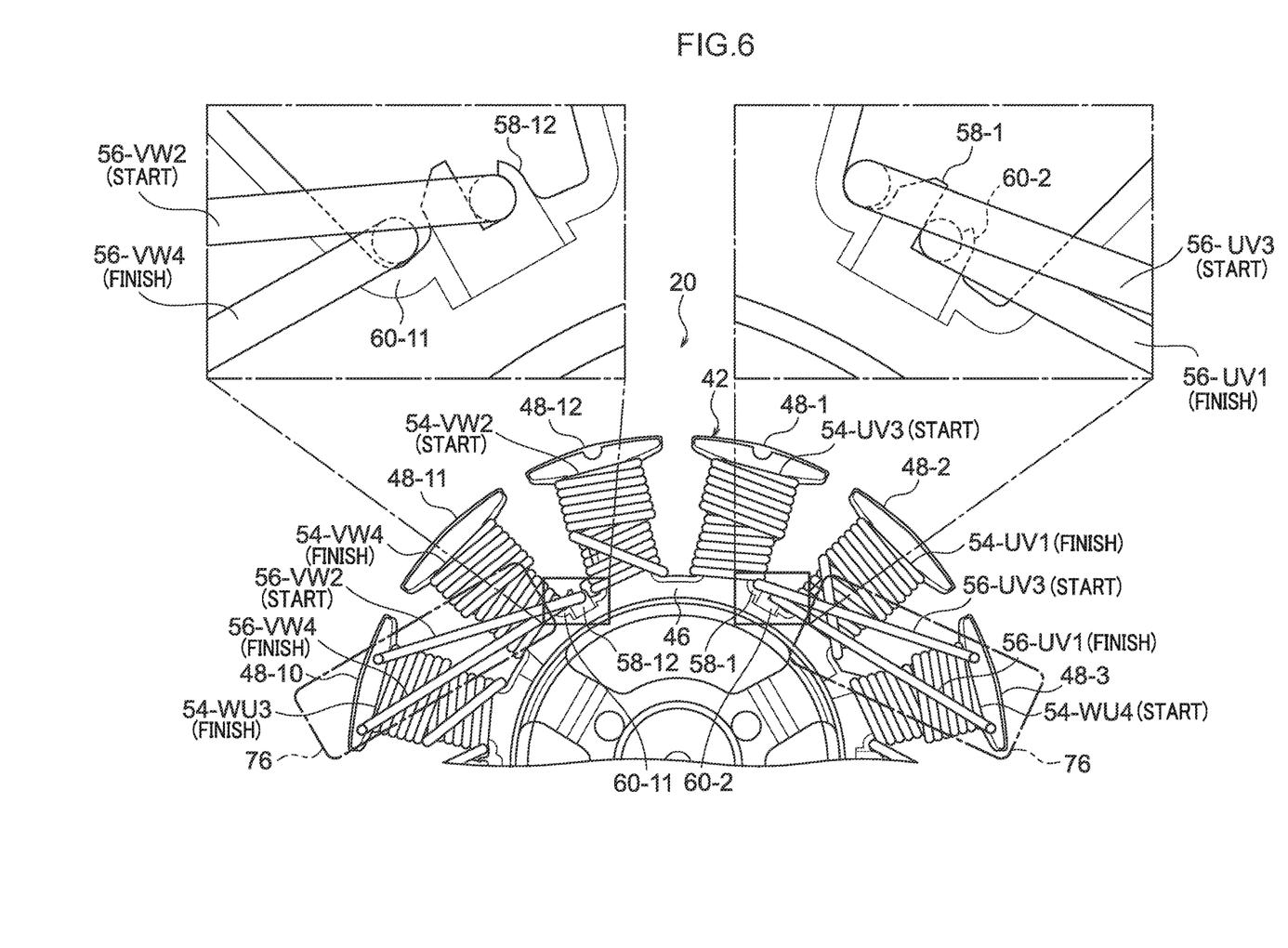
FIG. 6 is an enlarged plan view of relevant portions of a stator according to a comparative example.

In a comparative example illustrated in FIG. 6, positional relationships between the first retaining portions 58 and the second retaining portions 60 provided between the base end portions of respective adjacent teeth 48 are different from those in the present exemplary embodiment of the present disclosure described above. Namely, in the comparative example, the first retaining portions 58 and the second retaining portions 60 are disposed between the base end portions of respective adjacent teeth 48 at the same position in the stator core 42 radial direction (on the same circumference thereof).

However, if each first retaining portion 58 and the respective second retaining portion 60 are disposed between the base end portions of respective adjacent teeth 48 in the same position in the stator core 42 radial direction, as in this comparative example, and an attempt is made to respectively turn both the first winding terminal portion 56-UV3 (start) and the second winding terminal portion 56-UV1

(finish), for example, these winding terminal portions would impinge on each other and so could not be turned. Similarly, if an attempt is made to respectively turn both the eleventh winding terminal portion 56-VW4 (finish) and the twelfth winding terminal portion 56-VW2 (start), for example, these winding terminal portions would impinge on each other and so could not be turned.

In order to address this, as illustrated in FIG. 6, a conceivable approach would be to overlap the first winding terminal portion 56-UV3 (start) and the second winding terminal portion 56-UV1 (finish) onto each other in the axial direction of the stator core 42, and to also overlap the eleventh winding terminal portion 56-VW4 (finish) and the twelfth winding terminal portion 56-VW2 (start) onto each other in the axial direction of the stator core 42. However, the axial length of the stator 20, and therefore the axial length of the brushless motor, would increase in such cases.

Moreover, in such cases, a shaping tool 76 is disposed at the one axial direction side of the stator core 42 (above the coil ends of the winding coil sections 54) when bending the respective pair of winding terminal portions 56 in directions orthogonal to the axial direction of the stator core 42. Thus, the winding terminal portions 56 after bending jut out at the one axial direction side of the stator core 42 by the amount by which the tool 76 is disposed at the one axial direction side of the stator core 42, such that the axial length of the stator 20 is further increased.

In contrast thereto, the present exemplary embodiment of the present disclosure operates in the following manner.

As illustrated in FIG. 2, in the stator 20 according to the present exemplary embodiment of the present disclosure, the first retaining portions 58 and the second retaining portions 60 are disposed between the base end portions of respective adjacent teeth 48 so as to be offset from each other in both a circumferential direction and a radial direction of the stator core 42.

Thus, even if a pair of winding terminal portions 56 that has been guided out from between the base end portions of adjacent teeth 48 toward the one axial direction side of the stator core 42 is then extended in directions intersecting the stator core 42 radial direction as viewed along the axial direction of the stator core 42, the pair of winding terminal portions 56 can be suppressed from being overlapped onto each other in the axial direction of the stator core 42. This enables the pair of winding terminal portions 56 to be disposed alongside each other in directions orthogonal to the axial direction of the stator core 42.

This enables the bulkiness of the pairs of winding terminal portions 56 at the one axial direction side of the stator core 42 to be suppressed. Thus, the axial length of the stator 20, and therefore the axial length of the brushless motor 10 (see FIG. 1), can be made shorter than in cases in which a pair of winding terminal portions 56 are overlapped onto each other in the axial direction of the stator core 42, such as in the comparative example (see FIG. 6).

Further, in the stator 20 according to the present exemplary embodiment of the present disclosure as described above, each first retaining portion 58 and respective second retaining portion 60 are disposed offset from each other in the radial direction of the stator core 42, and the winding sequence of the fifth winding coil section 54-VW1, this being the first winding coil section of the VW phase, and the twelfth winding coil section 54-VW2, this being the second winding coil section of the VW phase, is such that the fifth winding coil section 54VW1 is the winding finish winding coil section thereof, and the twelfth winding coil section 54-VW2 is the winding start winding coil section thereof.

Similarly, in the stator 20 according to the present exemplary embodiment of the present disclosure, the winding sequence of the sixth winding coil section 54-VW3, this being the third winding coil section of the VW phase, and the eleventh winding coil section 54-VW4, this being the fourth winding coil section of the VW phase, is such that the sixth winding coil section 54-VW3 is the winding start winding coil section thereof, and the eleventh winding coil section 54-VW4 is the winding finish winding coil section thereof.

Thus, the first winding terminal portion 56-UV3 (start) and the second winding terminal portion 56-UV1 (finish), and the twelfth winding terminal portion 56-VW2 (start) and the eleventh winding terminal portion 56-VW4 (finish) are disposed with left-right symmetry to each other. Thus, as illustrated in FIG. 5, a shaping method can be employed in which the twelfth winding terminal portion 56-VW2 (start) and the eleventh winding terminal portion 56-VW4 (finish) are turned after having been bent in a direction orthogonal to the axial direction of the stator core 42 using the tool 66 inserted between the eleventh tooth 48-11 and the twelfth tooth 48-12.

Thus, there is no need to dispose a shaping tool at the one axial direction side of the stator core 42 (above the coil ends of the winding coil sections 54) when bending the twelfth winding terminal portion 56-VW2 (start) and the eleventh winding terminal portion 56-VW4 (finish) in a direction orthogonal to the axial direction of the stator core 42. This enables all the pairs of winding terminal portions 56, including the twelfth winding terminal portion 56-VW2 (start) and the eleventh winding terminal portion 56-VW4 (finish), to be closer to the coil ends of the winding coil sections 54, thereby enabling the axial length of the stator 20 to be made even shorter.

Explanation follows regarding modified examples of the present exemplary embodiment of the present disclosure.

In the above-described exemplary embodiment, as an example, the brushless motor 10 is a twelve-slot, ten-pole motor. However, the above-described structure, in which each first retaining portion 58 and the respective second retaining portion 60 disposed between the base end portions of respective adjacent teeth 48 so as to be disposed offset from each other in a circumferential direction and a radial direction of the stator core 42, and each pair of winding terminal portions 56 are disposed alongside each other in a direction orthogonal to the axial direction of the stator core 42, may be applied to brushless motors other than a twelve-slot, ten-pole brushless motor.

An exemplary embodiment of the present disclosure has been explained above; however, the present disclosure is not limited to the above description, and obviously various other modifications may be implemented within a range not departing from the spirit of the present disclosure.

What is claimed is:
1. A stator comprising:
   a stator core that includes a plurality of teeth extending in a radiating shape, the stator core being configured by a core main body and an insulator made of resin that covers the core main body;
   a plurality of winding coil sections that are respectively wound onto the plurality of teeth;
   a plurality of pairs of winding terminal portions that are respectively continuous to the plurality of winding coil sections, that are guided out from between base end portions of adjacent teeth of the plurality of teeth toward one axial direction side of the stator core, and that extend in directions intersecting a stator core radial direction as viewed along an axial direction of the stator core;
a plurality of first retaining portions that are each provided between the base end portions of the respective adjacent teeth, and that each retain a base end portion of one winding terminal portion of the respective pair of winding terminal portions; and
a plurality of second retaining portions that are each provided between the base end portions of the respective adjacent teeth, that each retain a base end portion of an other winding terminal portion of the respective pair of winding terminal portions, and that are each disposed between the base end portions of the respective adjacent teeth so as to be offset in a circumferential direction and a radial direction of the stator core with respect to the respective first retaining portion,
wherein the plurality of first retaining portions and the plurality of second retaining portions are formed integrally at the insulator.

2. The stator of claim 1, wherein:
in a case in which the plurality of teeth are twelve in number,
the plurality of winding coil sections are classified into winding start winding coil sections and winding finish winding coil sections that are each continuous to the respective winding start winding coil section, and
the plurality of teeth configure a first to a twelfth tooth in sequence around a circumferential direction of the stator core;
a first of the winding coil sections wound onto the first tooth is a winding start winding coil section;
a second of the winding coil sections wound onto the second tooth is a winding finish winding coil section;
a third of the winding coil sections wound onto the third tooth is a winding start winding coil section;
a fourth of the winding coil sections wound onto the fourth tooth is a winding finish winding coil section;
a fifth of the winding coil sections wound onto the fifth tooth is a winding finish winding coil section;
a sixth of the winding coil sections wound onto the sixth tooth is a winding start winding coil section;
a seventh of the winding coil sections wound onto the seventh tooth is a winding start winding coil section;
an eighth of the winding coil sections wound onto the eighth tooth is a winding finish winding coil section;
a ninth of the winding coil sections wound onto the ninth tooth is a winding start winding coil section;
a tenth of the winding coil sections wound onto the tenth tooth is a winding finish winding coil section;
an eleventh of the winding coil sections wound onto the eleventh tooth is a winding finish winding coil section; and
a twelfth of the winding coil sections wound onto the twelfth tooth is a winding start winding coil section.

3. The stator of claim 2, wherein:
a first of the winding terminal portions that is a winding start winding terminal portion continuous to the first winding coil section, and a second of the winding terminal portions that is a winding finish winding terminal portion continuous to the second winding coil section, are guided out from between the base end portion of the first tooth and the base end portion of the second tooth;
a third of the winding terminal portions that is a winding start winding terminal portion continuous to the third winding coil section, and a fourth of the winding terminal portions that is a winding finish winding terminal portion continuous to the fourth winding coil section, are guided out from between the base end portion of the third tooth and the base end portion of the fourth tooth;
a fifth of the winding terminal portions that is a winding finish winding terminal portion continuous to the fifth winding coil section, and a sixth of the winding terminal portions that is a winding start winding terminal portion continuous to the sixth winding coil section, are guided out from between the base end portion of the fifth tooth and the base end portion of the sixth tooth;
a seventh of the winding terminal portions that is a winding start winding terminal portion continuous to the seventh winding coil section, and an eighth of the winding terminal portions that is a winding finish winding terminal portion continuous to the eighth winding coil section, are guided out from between the base end portion of the seventh tooth and the base end portion of the eighth tooth;
a ninth of the winding terminal portions that is a winding start winding terminal portion continuous to the ninth winding coil section, and a tenth of the winding terminal portions that is a winding finish winding terminal portion continuous to the tenth winding coil section, are guided out from between the base end portion of the ninth tooth and the base end portion of the tenth tooth; and
an eleventh of the winding terminal portions that is a winding finish winding terminal portion continuous to the eleventh winding coil section, and a twelfth of the winding terminal portions that is a winding start winding terminal portion continuous to the twelfth winding coil section, are guided out from between the base end portion of the eleventh tooth and the base end portion of the twelfth tooth.

4. The stator of claim 3, wherein:
the first retaining portion retaining the base end portion of the first winding terminal portion as the one winding terminal portion, is disposed further, than the second retaining portion retaining the base end portion of the second winding terminal portion as the other winding terminal portion, to the first tooth side and to the stator core radial direction outside;
the first winding terminal portion and the second winding terminal portion extend from between the base end portion of the first tooth and the base end portion of the second tooth toward a leading end portion of the third tooth;
the first retaining portion retaining the base end portion of the third winding terminal portion as the one winding terminal portion, is disposed further, than the second retaining portion retaining the base end portion of the fourth winding terminal portion as the other winding terminal portion, to the third tooth side and to the stator core radial direction outside;
the third winding terminal portion and the fourth winding terminal portion extend from between the base end portion of the third tooth and the base end portion of the fourth tooth toward a leading end portion of the fourth tooth;
the first retaining portion retaining the base end portion of the fifth winding terminal portion as the one winding terminal portion, is disposed further, than the second retaining portion retaining the base end portion of the sixth winding terminal portion as the other winding terminal portion, to the fifth tooth side and to the stator core radial direction inside;

the fifth winding terminal portion and the sixth winding terminal portion extend from between the base end portion of the fifth tooth and the base end portion of the sixth tooth toward a leading end portion of the sixth tooth;

the first retaining portion retaining the base end portion of the eighth winding terminal portion as the one winding terminal portion, is disposed further, than the second retaining portion retaining the base end portion of the seventh winding terminal portion as the other winding terminal portion, to the eighth tooth side and to the stator core radial direction inside;

the seventh winding terminal portion and the eighth winding terminal portion extend from between the base end portion of the seventh tooth and the base end portion of the eighth tooth toward a leading end portion of the seventh tooth;

the first retaining portion retaining the base end portion of the tenth winding terminal portion as the one winding terminal portion, is disposed further, than the second retaining portion retaining the base end portion of the ninth winding terminal portion as the other winding terminal portion, to the tenth tooth side and to the stator core radial direction inside;

the ninth winding terminal portion and the tenth winding terminal portion extend from between the base end portion of the ninth tooth and the base end portion of the tenth tooth toward a leading end portion of the ninth tooth;

the first retaining portion retaining the base end portion of the twelfth winding terminal portion as the one winding terminal portion, is disposed further, than the second retaining portion retaining the base end portion of the eleventh winding terminal portion as the other winding terminal portion, to the twelfth tooth side and to the stator core radial direction outside; and the eleventh winding terminal portion and the twelfth winding terminal portion extend from between the base end portion of the eleventh tooth and the base end portion of the twelfth tooth toward a leading end portion of the tenth tooth.

5. A brushless motor comprising:
the stator of claim 1; and
a rotor that is rotated by a rotating magnetic field generated by the stator.

6. A stator manufacturing method for manufacturing the stator of claim 1, the stator manufacturing method comprising:

retaining each of the pairs of winding terminal portions, which have been guided out toward the one axial direction side of the stator, between the base end portions of the respective adjacent teeth using the respective first retaining portion and the respective second retaining portion;

inserting a tool between the respective adjacent teeth;

bending each of the pairs of winding terminal portions using the tool; and turning each of the pairs of winding terminal portions such that the respective pair of winding terminal portions extend in directions intersecting a radial direction of the stator core as viewed along the axial direction view of the stator core.

* * * * *